United States Patent
Lee et al.

(10) Patent No.: US 10,939,242 B2
(45) Date of Patent: Mar. 2, 2021

(54) GPS CONTROL SYSTEM OF MOBILE DEVICE FOR LOCATION BASED SERVICE AND OPERATING METHOD THEREFOR

(71) Applicant: Do-Hun Lee, Gwangyang-si (KR)

(72) Inventors: Do-Hun Lee, Gwangyang-si (KR); Jeong-Seo Cheon, Gwangyang-si (KR); Joo-Sang Lee, Gwangyang-si (KR); Ji-Min Lee, Gwangyang-si (KR)

(73) Assignee: Do-Hun Lee, Gwangyang-si (KR)

( * ) Notice: Subject to any disclaimer, the term of this patent is extended or adjusted under 35 U.S.C. 154(b) by 0 days.

(21) Appl. No.: 16/648,069

(22) PCT Filed: Sep. 14, 2018

(86) PCT No.: PCT/KR2018/010811
§ 371 (c)(1),
(2) Date: Mar. 17, 2020

(87) PCT Pub. No.: WO2019/054789
PCT Pub. Date: Mar. 21, 2019

(65) Prior Publication Data
US 2020/0236503 A1    Jul. 23, 2020

(30) Foreign Application Priority Data

Sep. 18, 2017 (KR) .................. 10-2017-0119246

(51) Int. Cl.
| | | |
|---|---|---|
| *H04W 24/00* | (2009.01) | |
| *H04W 4/029* | (2018.01) | |
| *H04W 4/80* | (2018.01) | |
| *G01S 19/13* | (2010.01) | |
| *H04W 84/12* | (2009.01) | |

(52) U.S. Cl.
CPC ............. *H04W 4/029* (2018.02); *G01S 19/13* (2013.01); *H04W 4/80* (2018.02); *H04W 84/12* (2013.01)

(58) Field of Classification Search
CPC ....... H04W 4/029; H04W 4/80; H04W 84/12; H04W 88/06; H04W 4/02; G01S 19/13
USPC .............................. 455/456.1–456.3; 370/338
See application file for complete search history.

(56) References Cited

U.S. PATENT DOCUMENTS

| | | | | |
|---|---|---|---|---|
| 6,590,525 | B2 * | 7/2003 | Yule et al. ........ | H04W 52/0225 370/311 |
| 2015/0296458 | A1 * | 10/2015 | Abraham .......... | H04W 52/0225 370/311 |

FOREIGN PATENT DOCUMENTS

| | | | |
|---|---|---|---|
| KR | 10-0557080 B1 | 3/2006 | |
| KR | 10-2007-0098257 A | 10/2007 | |
| KR | 10-0757792 B1 | 10/2007 | |

(Continued)

*Primary Examiner* — Marcos Batista
(74) *Attorney, Agent, or Firm* — Maschoff Brennan

(57) ABSTRACT

The present invention relates to a location-based service technology for a mobile device. The present invention relates to a GPS control system of a mobile device for a location-based service and an operating method therefor, which, even in a state where a GPS receiving unit included in a mobile device for a location-based service is disabled, activates the GPS receiving unit to thus provide the mobile location-based service, and then brings the GPS receiving unit to the original state thereof, and also, when the mobile device moves at a predetermined speed or higher, provides the mobile location-based service by detecting the movement of the mobile device and activating the GPS receiving unit.

6 Claims, 8 Drawing Sheets

(56) References Cited

FOREIGN PATENT DOCUMENTS

| KR | 10-1420906 B1 | 7/2012 |
|----|---------------|--------|
| KR | 10-2013-0029275 A | 3/2013 |
| KR | 10-1343372 A | 12/2013 |
| KR | 10-1412703 A | 6/2014 |
| KR | 10-2017-0015943 A | 2/2017 |

* cited by examiner

[FIG. 1]
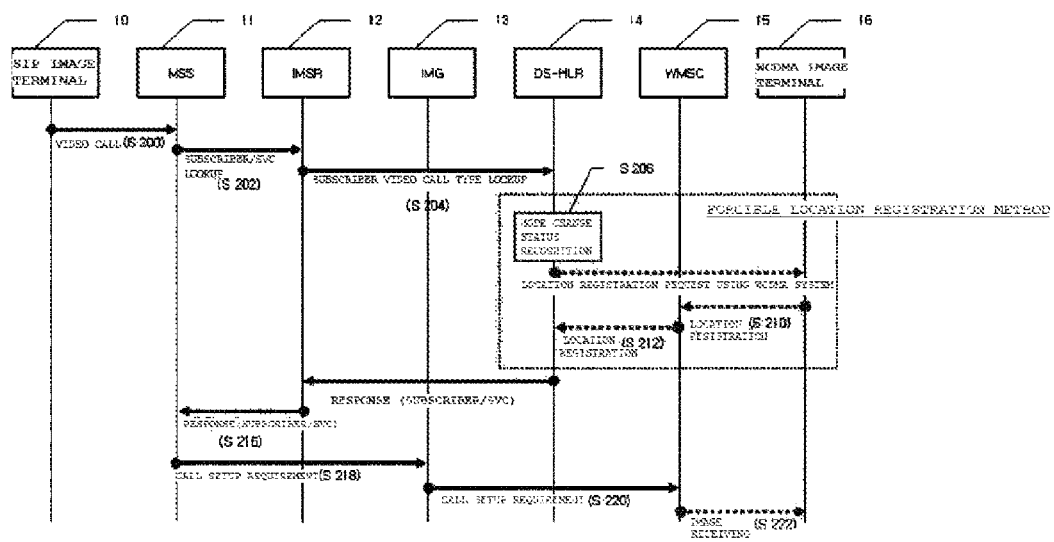
(BACKGROUND TECHNOLOGY)

[FIG. 2]
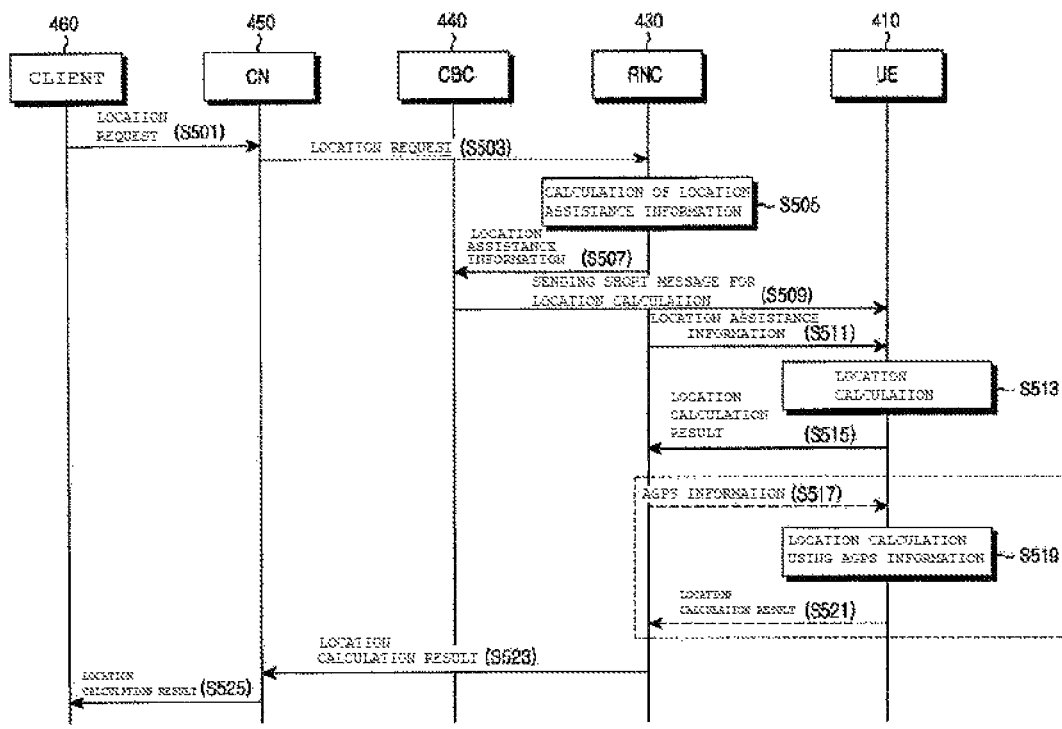

[FIG. 3]
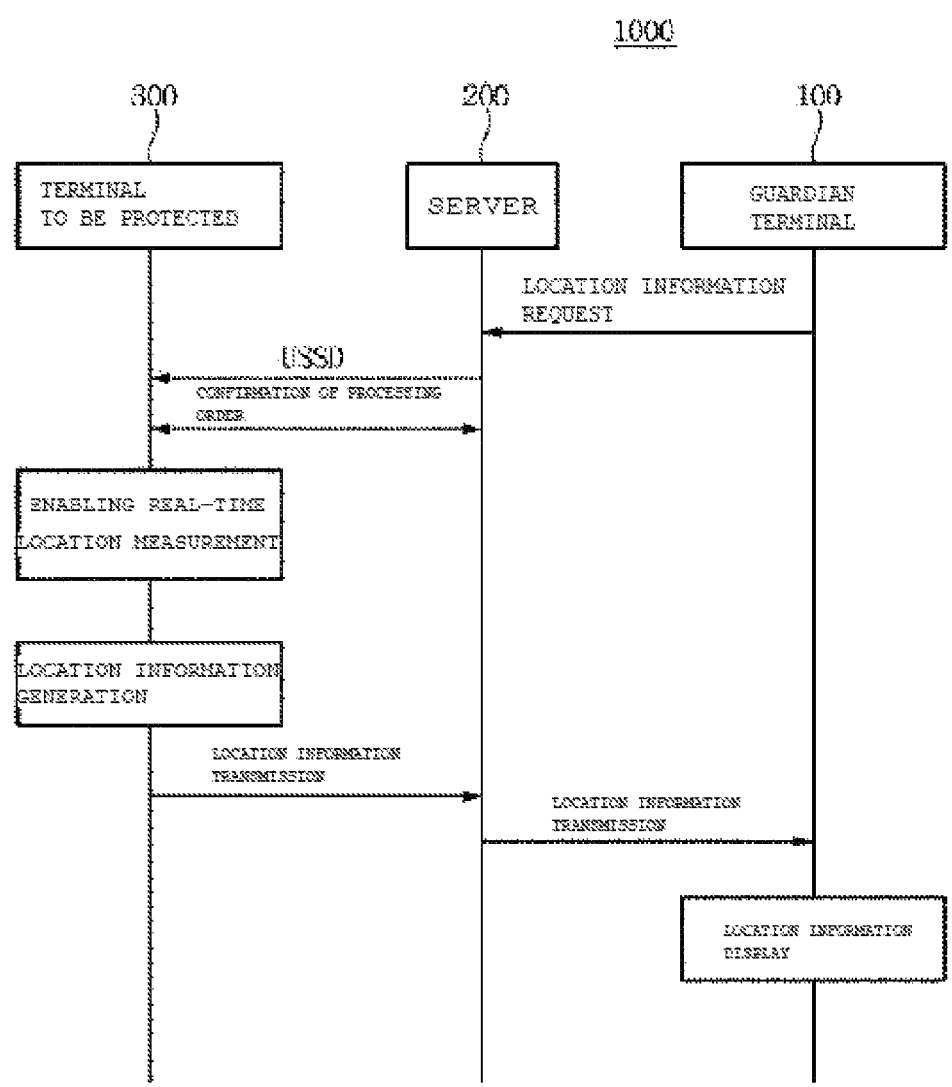

[FIG. 4]
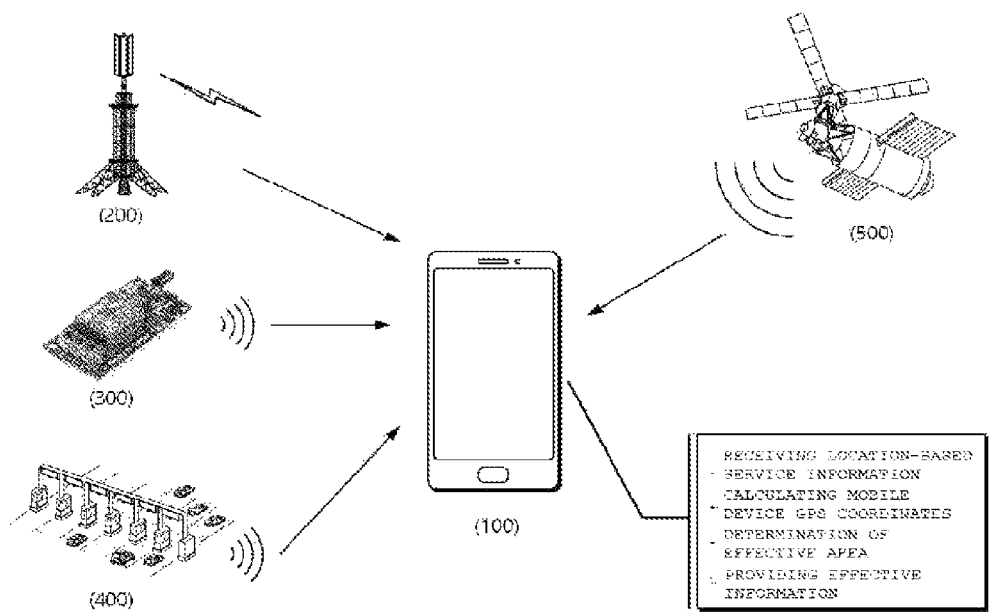

[FIG. 5]
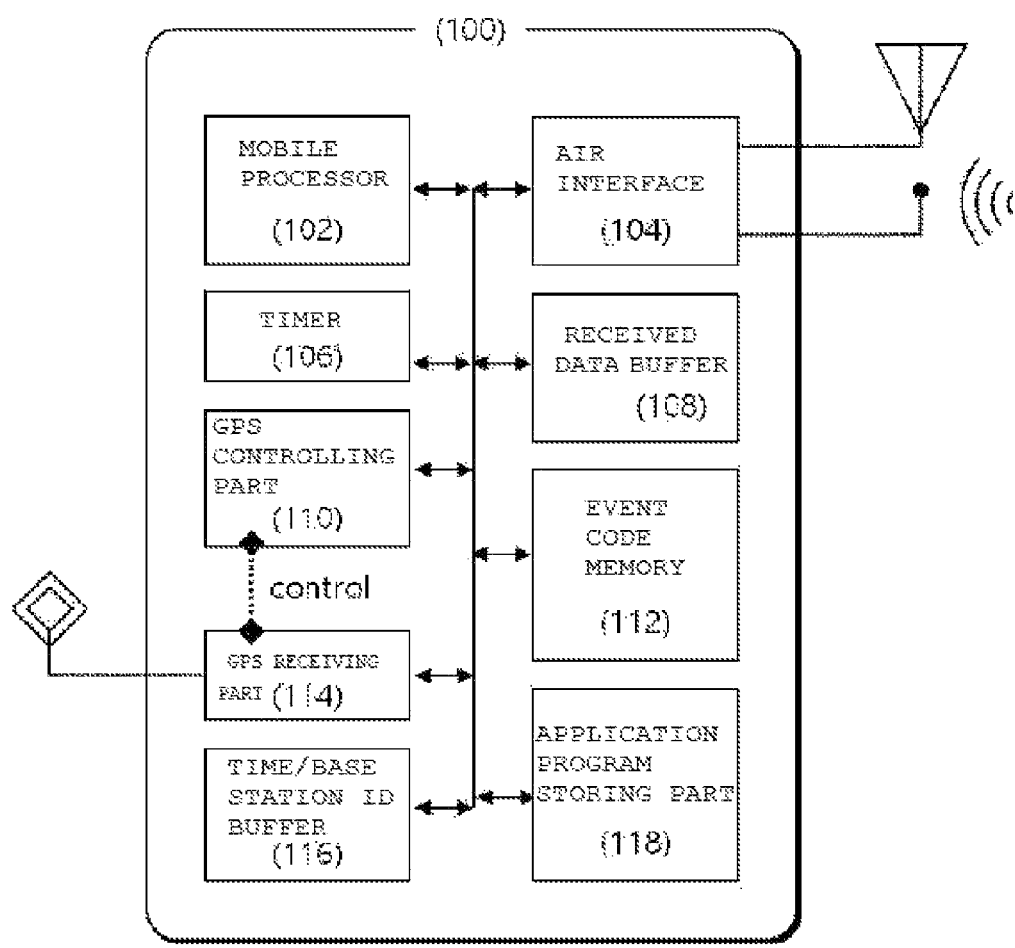

[FIG. 6]
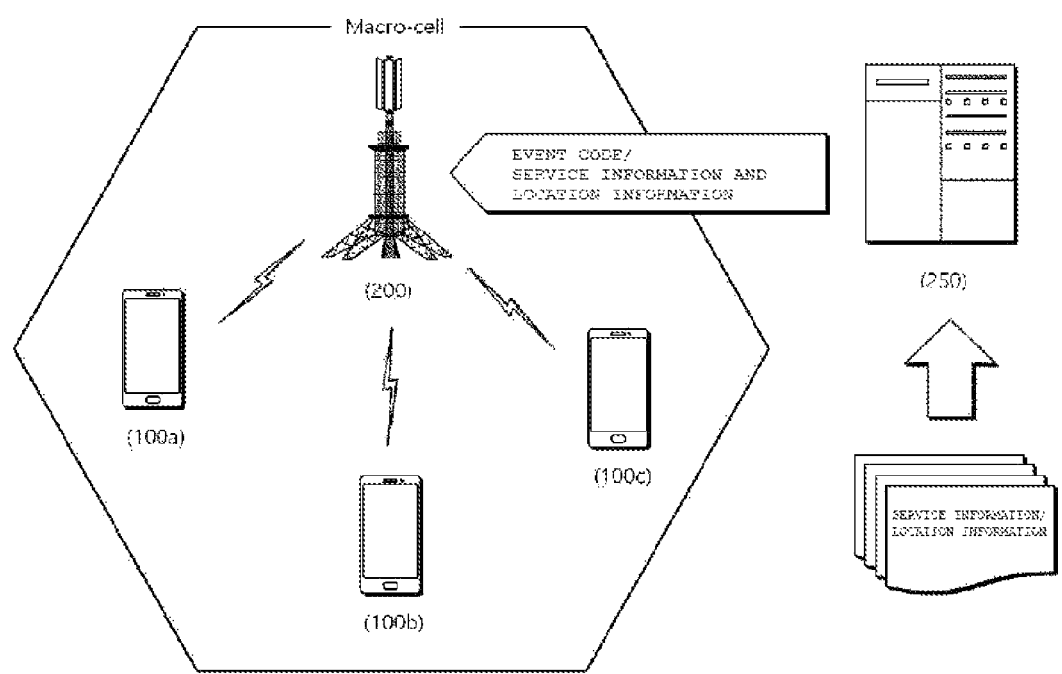

[FIG. 7]
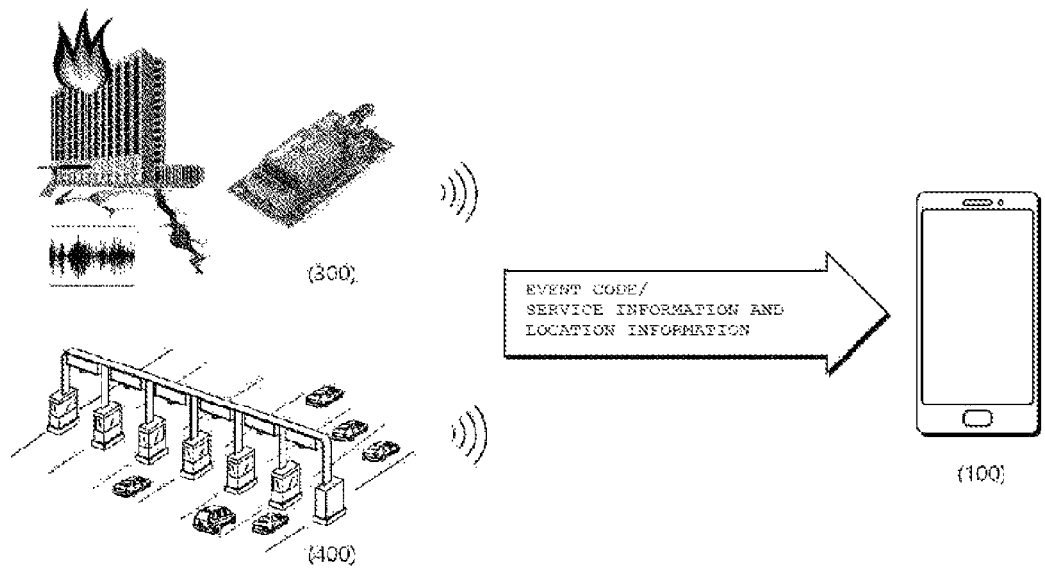
[FIG. 8]
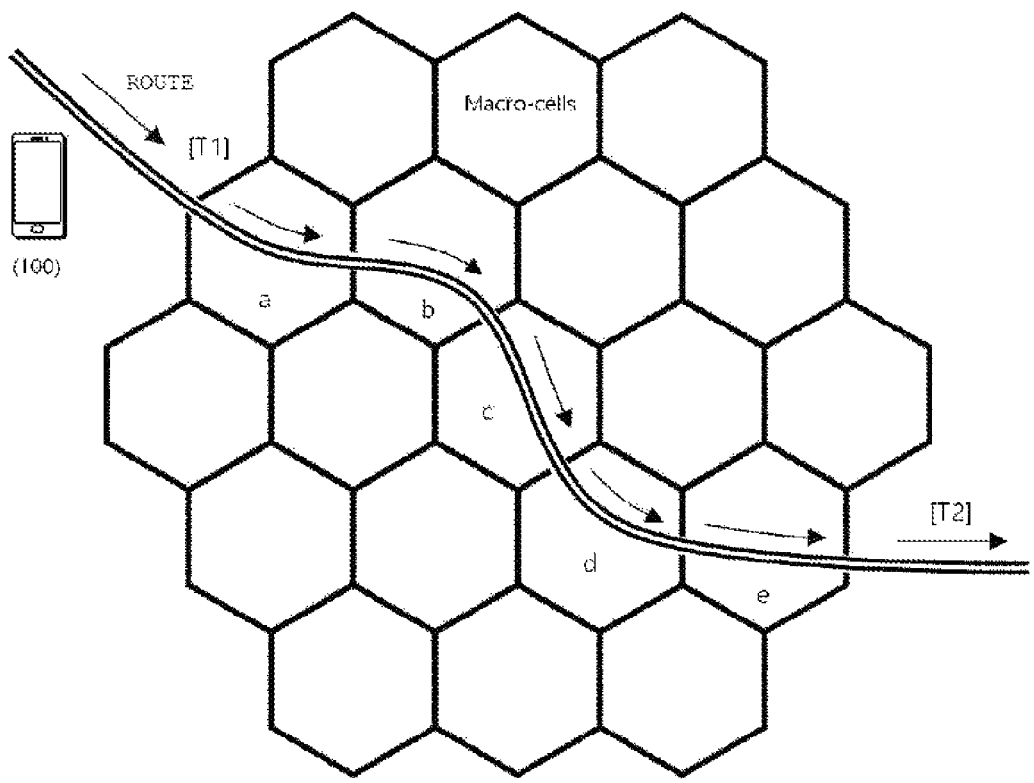

[FIG. 9]
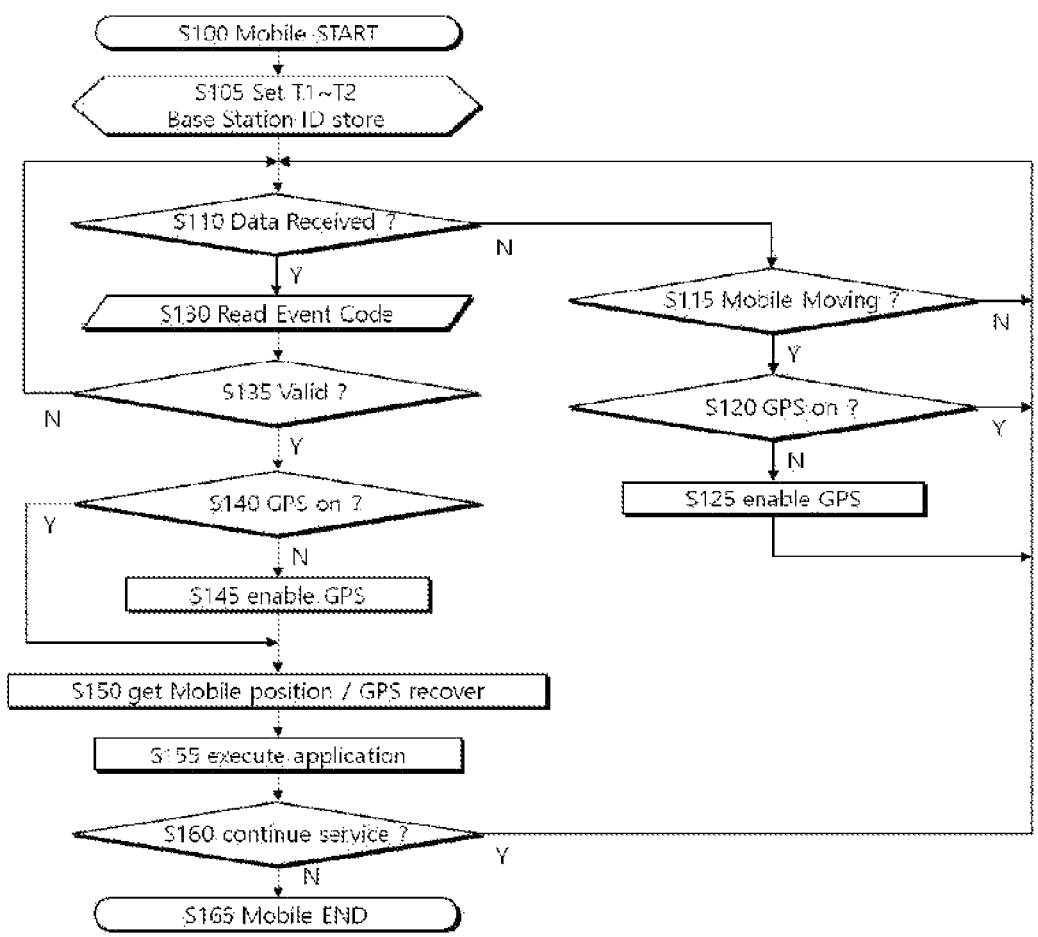

GPS CONTROL SYSTEM OF MOBILE DEVICE FOR LOCATION BASED SERVICE AND OPERATING METHOD THEREFOR

TECHNICAL FIELD

The present invention relates to location-based service technology applied to mobile devices. More particularly, the present invention relates to a GPS control system of a mobile device for location-based services and a method of operating the GPS control system. According to the present invention, when considering location-based services, even when a GPS receiving part provided in a mobile device is disabled, the GPS receiving part may be enabled to provide mobile location-based services, and then the GPS receiving part may be restored to the original state thereof. In addition, when a mobile device 100 moves at a speed higher than a predetermined speed, the movement may be detected and the GPS receiving part may be enabled to provide mobile location-based services.

BACKGROUND ART

As a related art, as shown in FIG. 1, there is Korean Patent No. 10-1343372 disclosing a method of providing a terminal image receiving service using a forced location registration technique in a mobile communication network and a device technology therefor. According to this technology, by performing forcible location registration of a WCDMA image terminal, in which DS-HLR is changed to a CDMA2000-1x mode, using a WCDMA system, a video call service is available from an SIP image terminal to the WCDMA image terminal. To solve the problem that a video call does not work when an SIP image terminal sends images to a WCDMA image terminal in which a mode is changed to a CDMA 2000-1x mode, in call processing when a video call is received, in a mobile communication network allowing image reception by performing forcible location registration of a WCDMA image terminal, in which DS-HLR is changed to a CDMA 2000-1x mode, using a WCDMA system, a method of providing a terminal image receiving service by forced location registration technique and a device therefor are provided.

As another related art, as shown in FIG. 2, there is Korean Patent No. 10-0557080 disclosing a device for determining the location of a mobile communication terminal and a method of determining the location of a mobile communication terminal. According to this technology, the location request messages of mobile communication terminals received by external clients are received. In response to the location request messages, a base station identifier for a specific region and a list of cells included in the specific region are calculated. Based on the calculation results, location assistance information for calculating the locations of the mobile communication terminals is calculated. Then, the calculated location assistance information is transmitted to all mobile communication terminals (mobile communication terminals connected to a communication network and mobile communication terminals in an idle state) located in the specific region, and location calculation results are received by the mobile communication terminals. According to this technology, the locations of all mobile communication terminals located in a specific region may be rapidly determined. In addition, regardless of whether provision of location information of mobile communication terminals is permitted, the locations of the mobile communication terminals may be determined.

As yet another related art, as shown in FIG. 3, there is Korean Patent No. 10-1420906 disclosing a method of determining the location of a mobile communication terminal provided with a GPS and providing a safe service. According to this technology, when a guardian terminal requests a server for the location information of a terminal to be protected, the server acquires location information by activating determination of the real-time location of the terminal to be protected, and the acquired location information is transmitted to the guardian terminal to inform a guardian of the current location information of the terminal to be protected. The method includes a step of requesting the location information of a terminal to be protected from a guardian terminal to a server; a step in which the server receiving the request activates real-time location determination by transmitting an unstructured supplementary service data (USSD) message using a wideband code division multiple access (WCDMA) wireless network to the GPS-provided terminal to be protected; and a step in which the terminal to be protected receiving the USSD message performs a location determination operation to acquire the location information of the terminal to be protected and the acquired location information is transmitted to the guardian terminal through the server. In this case, the terminal to be protected is provided with an emergency button. When the emergency button is enabled by an object to be protected, real-time location determination of the terminal to be protected is enabled without transmission of the USSD message, the terminal to be protected performs real-time location determination to transmit an emergency message and location information to the server, and the emergency message and the location information received by the server are transmitted to the guardian terminal.

DISCLOSURE

Technical Problem

Therefore, the present invention has been made in view of the above problems, and it is one object of the present invention to provide a GPS control system of a mobile device for location-based services and a method of operating the GPS control system. According to the present invention, even when a GPS receiving part provided in a mobile device is disabled, the GPS receiving part may be enabled to provide mobile location-based services, and then the GPS receiving part may be restored to the original state thereof. In addition, when a mobile device moves at a speed higher than a predetermined speed, the movement may be detected and the GPS receiving part may be enabled to provide mobile location-based services.

Technical Solution

In accordance with one aspect of the present invention, provided are a GPS control system of a mobile device for location-based services and a method of operating the GPS control system, wherein the GPS control system is provided with a mobile device (100) consisting of a mobile processor (102) for controlling the mobile device (100); an air interface (104) for communicating through a mobile communication network via the base station (200) and a wireless channel such as near field communication (NFC), Bluetooth, and Wi-Fi; a timer (106) for setting and reading time intervals; a received data buffer (108) for storing service information, location information, and event codes received by the air interface (104); a GPS controlling part (110) for reading on/off states of a GPS receiving part and enabling or disabling the GPS receiving part under control of the mobile processor (102); a GPS receiving part (114) for calculating GPS coordinates of a current location of the mobile device (100); an event code memory (112) for determining effectiveness of event codes stored in the received data buffer (108) by storing event codes for location-based services as tables; a time/base station ID buffer (116) for storing IDs and connection change (handover) time of mobile communication base stations of macro-cells connected during a time interval set by the timer (106); and an application program storing part (118) for providing location-based services according to service information, location information, and event codes received by the air interface (104).

Advantageous Effects

According to the present invention, even when a GPS receiving part provided in a mobile device is disabled, the GPS receiving part can be enabled to provide mobile location-based services, and then the GPS receiving part can be restored to the original state thereof. In addition, when a mobile device moves at a speed higher than a predetermined speed, the GPS receiving part can be enabled to provide mobile location-based services.

DESCRIPTION OF DRAWINGS

FIG. 1 shows, as a related art, a method of providing a terminal image receiving service by a forced location registration technique in a mobile communication network and a device therefor.

FIG. 2 shows, as another related art, a device for determining the location of a mobile communication terminal and a method thereof.

FIG. 3 shows, as yet another related art, a method of determining the location of a GPS-provided mobile communication terminal and providing a safe service.

FIG. 4 is an exemplary diagram for explaining mobile location-based services.

FIG. 5 shows the detailed configuration of a mobile device provided with a GPS control system of a mobile device for location-based services according to the present invention.

FIG. 6 shows the working relationship of location-based services through a base station according to the present invention.

FIG. 7 shows the basic working relationship of location-based services through a disaster detection transmission means and a near field communication means according to the present invention.

FIG. 8 shows the working relationship of a location-based service according to the present invention, in which, when a mobile device moves at a speed higher than a predetermined speed, the movement is detected and a GPS receiving part is enabled.

FIG. 9 is a flowchart for explaining a method of operating a GPS control system of a mobile device for location-based services according to the present invention.

BEST MODE

Hereinafter, the principles of the present invention will be described with reference to embodiments. Accordingly, those skilled in the art to which the present invention pertains may implement the principles of the present invention and may invent various devices and methods included in the concept and scope of the present invention, although not clearly described or illustrated herein. In addition, in principle, all conditional terms and embodiments listed herein are provided for the purpose of understanding the concept of the invention, and it is to be understood that the invention is not limited to such embodiments and terms. In addition, it is to be understood that the principles, aspects, and embodiments of the present invention and all detailed descriptions listing a specific embodiment are intended to include structural and functional equivalents of these matters.

The above objects, features, and advantages will become more apparent from the following detailed description taken in conjunction with the accompanying drawings. In describing the present invention, when it is determined that the detailed description of the related known technology may obscure the subject matter of the present invention, the detailed description thereof will be omitted. Hereinafter, exemplary embodiments of the present invention will be described in detail with reference to the accompanying drawings.

FIG. 4 is an exemplary diagram for explaining mobile location-based services. Mobile location-based services include various services for providing disaster information, accident information, lifestyle information, financial payment, and the like corresponding to the location of a mobile device 100. Sources for providing the mobile location-based services may include a base station 200 as a communication channel through the server of a mobile communication company, a disaster detection transmission means 300 for detecting disasters such as fire and earthquake and providing the disaster information to a wireless communication channel separate from a mobile communication channel, and a near field communication means 400 for paying for use of toll roads. In the present invention, mobile location-based service information provided from the base station 200, the disaster detection transmission means 300, and the near field communication means 400 include various service information, such as disaster information, accident information, lifestyle information, and financial payment information, and location information for corresponding locations. The mobile device 100 provided with the location-based service information calculates the geographic coordinates (GPS coordinates) of the mobile device 100 using a PN code and time information transmitted from a plurality of GPS satellites 500, and filters information within an effective area using the geographic coordinates for mobile location-based service information provided from the base station 200, the disaster detection transmission means 300, and the near field communication means 400 and provides the filtered information to a user.

However, to use the mobile location-based services, a separate application program for each service must be selected by a user and must be executed. In addition, the application programs become useless when a GPS receiving part provided in the mobile device 100 is disabled.

An object of the present invention is to solve the above problems. The present invention provides a GPS control system of a mobile device for location-based services and a method of operating the GPS control system. According to the present invention, when the mobile device 100 is provided with mobile location-based service information, depending on whether a GPS receiving part is enabled, when the GPS receiving part is disabled, the GPS receiving part is enabled to provide mobile location-based services, and then the GPS receiving part is restored to the original sate thereof. In addition, the present invention provides a GPS control system of a mobile device for location-based services and a method of operating the GPS control system. According to the present invention, when the mobile device 100 moves at a speed higher than a predetermined speed, the movement is detected and the GPS receiving part is enabled to provide mobile location-based services.

FIG. 5 shows the detailed configuration of a mobile device 100 provided with a GPS control system of a mobile device for location-based services according to the present invention. The mobile device 100 of the present invention consists of:

a mobile processor 102 for controlling the mobile device 100; an air interface 104 for communicating through a mobile communication network via the base station 200 and a wireless channel such as near field communication (NFC), Bluetooth, and Wi-Fi; a timer 106 for setting and reading time intervals; a received data buffer 108 for storing service information, location information, and event codes received by the air interface 104; a GPS controlling part 110 for reading the on/off states of a GPS receiving part and enabling or disabling the GPS receiving part under control of the mobile processor 102; a GPS receiving part 114 for calculating the GPS coordinates of a current location of the mobile device 100; an event code memory 112 for determining the effectiveness of the event codes stored in the received data buffer 108 by storing event codes for location-based services as tables; a time/base station ID buffer 116 for storing the IDs and the connection change (handover) time of the mobile communication base stations of macro-cells connected during a time interval set by the timer 106; and an application program storing part 118 for providing location-based services according to service information, location information, and event codes received by the air interface 104.

FIG. 6 shows the working relationship of location-based services through the base station 200 according to the present invention. As for the location-based services through the base station 200 according to the present invention, various types of service information, such as disaster information, accident information, and lifestyle information, and location information corresponding to each service information are stored in a service server 250 and are transmitted to mobile devices 100a, 100b, and 100c through the base station 200 via a mobile communication network from the service server 250. In this case, location information is information corresponding to a location where disaster information, accident information, or lifestyle information is generated, and is preferably provided in GPS coordinates. In the present invention, along with the service information and the location information, event codes are transmitted from the service server 250 to the mobile devices 100a, 100b, and 100c. As for the event codes of the present invention, for location-based service information received by enabling the GPS receiving part of a mobile device, information within an effective area is filtered and provided to users. Depending on location-based service information of the present invention, the event codes may be divided into 8 or more binary codes, respectively, and assigned. Service information, location information, and event codes transmitted from the base station 200 are received by the air interface 104 of a mobile device and stored in the received data buffer 108. The mobile processor 102 reads the event codes from the received data buffer 108 and refers to the tables of the event code memory 112 to determine whether the received event codes are effective event codes. When the mobile processor 102 determines that the effective event codes present in the tables of the event code memory 112 have been received, the mobile processor 102 determines, through the GPS controlling part 110, whether the GPS receiving part 114 is enabled, when the GPS receiving part 114 is disabled, the mobile processor 102 enables the GPS receiving part 114 and calculates the GPS coordinates of the mobile device. Then, the mobile processor 102 restores the GPS receiving part 114 to the previous state thereof through the GPS controlling part 110. When the information of the received data buffer 108 is determined to be information within an effective area when comparing the location information transmitted from the base station 200 and the GPS coordinates of the mobile device, a corresponding program of the application program storing part 118 is executed to provide location-based services.

Accordingly, a mobile receiving service information, location information, and event codes as the location-based services through the base station 200 according to the present invention may enable the GPS receiving part to calculate the current location of the mobile device as GPS coordinates, and may perform filtering of information within an effective area for the received service information and location information to provide the information to a user.

FIG. 7 shows the basic working relationship of location-based services through the disaster detection transmission means 300 and the near field communication means 400 according to the present invention. The disaster detection transmission means 300 detects disasters such as fire and earthquake using a sensor and provides the information to a wireless communication channel, and the near field communication means 400 provides service information such as financial payment information for paying for use of toll roads. The mobile device 100 is provided with the service information and location information for a corresponding location. The mobile device 100 provided with the location-based service information calculates geographic coordinates (GPS coordinates), and performs filtering of information within an effective area, using the geographic coordinates, for mobile location-based service information provided from the disaster detection transmission means 300 and the near field communication means 400 and provides the information to a user.

According to the present invention, along with the service information and the location information, event codes are transmitted from the disaster detection transmission means 300 and the near field communication means 400 to the mobile device 100. As for the event codes of the present invention, for location-based service information received by enabling the GPS receiving part of a mobile device, information within an effective area is filtered and provided to a user. Depending on location-based service information of the present invention, the event codes may be divided into 8 or more binary codes, respectively, and assigned.

Service information, location information, and event codes transmitted from the disaster detection transmission means 300 and the near field communication means 400 are received by the air interface 104 of a mobile device and stored in the received data buffer 108. The mobile processor 102 reads the event codes from the received data buffer 108 and refers to the tables of the event code memory 112 to determine whether the received event codes are effective event codes. When the mobile processor 102 determines that the effective event codes present in the tables of the event code memory 112 have been received, the mobile processor 102 determines, through the GPS controlling part 110, whether the GPS receiving part 114 is enabled, when the GPS receiving part 114 is disabled, the mobile processor 102 enables the GPS receiving part 114 and calculates the GPS coordinates of the mobile device. Then, the mobile processor 102 restores the GPS receiving part 114 to the previous state thereof through the GPS controlling part 110. When the information of the received data buffer 108 is determined to be information within an effective area when comparing the location information transmitted from the disaster detection transmission means 300 and the near field communication means 400 and the GPS coordinates of the mobile device, a corresponding program of the application program storing part 118 is executed to provide location-based services.

FIG. 8 shows the working relationship of a location-based service according to the present invention, in which, when the mobile device 100 moves at a speed higher than a predetermined speed, the movement is detected and a GPS receiving part is enabled. As for the location-based services of the present invention described in FIGS. 6 and 7, the mobile device 100 receiving service information, location information, and event codes enables the GPS receiving part and performs filtering of information within an effective area to provide the information to a user. In addition, according to the present invention, when a user having the mobile device 100 moves a highway or a national road using a vehicle, the mobile device 100 may detect the movement and may receive location-based services by enabling the GPS receiving part.

In this case, it may be determined whether the mobile device 100 is moving by storing the IDs and the connection change (handover) time of the mobile communication base stations of macro-cells connected during a predetermined time interval T1 to T2. Specifically, in the mobile device 100, a predetermined time interval of T1 to T2 is set in the timer 106 under the control of the mobile processor 102, the IDs and the connection change (handover) time of the mobile communication base stations of macro-cells connected during the set time interval are stored in the time/base station ID buffer 116. Then, the mobile processor 102 refers to the IDs and the connection change (handover) time of the mobile communication base stations stored in the time/base station ID buffer 116 to determine whether the mobile device 100 is moving. When the mobile processor 102 determines that the mobile device 100 is moving, the mobile processor 102 determines, through the GPS controlling part 110, whether the GPS receiving part 114 is currently enabled. When the GPS receiving part 114 is disabled, the mobile processor 102 enables the GPS receiving part 114. Accordingly, the mobile device 100 is set to be in a state capable of receiving location-based services through the base station 200, the disaster detection transmission means 300, and the near field communication means 400.

FIG. 7 shows that the mobile communication base stations of macro-cells change in the order of a-b-c-d-e during a time interval of T1 to T2. Preferably, it is determined whether a mobile device is moving depending on whether three or more mobile communication base stations are changed during the time interval of T1 to T2. Accordingly, when the IDs of three or more mobile communication base station are changed during the time interval of T1 to T2, the mobile device 100 for location-based services according to the present invention may receive location-based services by enabling a GPS receiving part.

The GPS control system of a mobile device for location-based services according to the present invention receives service information, location information, and event codes from the base station 200 or the disaster detection transmission means 300 and the near field communication means 400, identifies the event codes, enables a GPS receiving part, and performs filtering of information within an effective area to provide the information to a user. In this case, after the mobile device 100 enables the GPS receiving part and performs filtering of information within an effective area to provide the information to a user, the mobile device 100 may be restored to the previous state thereof, i.e., a state wherein the GPS receiving part is disabled.

In addition, when the IDs of three or more mobile communication base stations are changed during a predetermined time interval of T1 to T2, the GPS control system of a mobile device for location-based services according to the present invention may enable the GPS receiving part to receive location-based services. In this case, the mobile device 100 filters information within an effective area for information received by enabling the GPS receiving part and provides the information to a user. Upon determining that the mobile device 100 stays within a certain base station, the mobile device 100 may be restored to the previous state thereof, i.e., a state wherein the GPS receiving part is disabled.

FIG. 9 is a flowchart for explaining a method of operating a GPS control system of a mobile device for location-based services according to the present invention. Hereinafter, the method according to the present invention will be described stepwise.

The method of operating a GPS control system of a mobile device for location-based services includes;

step S100 of initiating operation of the mobile device 100;

step S105 of setting a predetermined time interval in the timer 106 by the mobile processor 102 of the mobile device 100 and storing the IDs and the connection change (handover) time of the mobile communication base stations of macro-cells connected during the set predetermined time interval in the time/base station ID buffer 116;

step S110 of determining, through the air interface 104, by the mobile processor 102 whether data has been received via a mobile communication network or a wireless channel;

step S130 of reading event codes from the received data buffer 108 by the mobile processor 102 upon determining in step S110 that data has been received;

step S135 of determining, by the mobile processor 102, whether the event codes read in step S130 are effective by referring to the tables of the event code memory 112, and of returning to step S110 and repeating the subsequent steps when the event codes are not effective;

step S140 of, upon determining in step S135 that the event codes are effective, determining, through the GPS controlling part 110, by the mobile processor 102 whether the GPS receiving part 114 of the mobile device 100 is enabled;

step S145 of enabling the GPS receiving part (114), through the GPS controlling part 110, by the mobile processor 102 upon determining in step S140 that the GPS receiving part 114 is disabled, or jumping to step S150 upon determining in step S140 that the GPS receiving part 114 is enabled;

step S150 of calculating the location of the mobile device 100 as GPS coordinates from the GPS receiving part 114 by the mobile processor 102 and enabling or disabling the GPS receiving part 114 to restore the GPS receiving part 114 to the previous state thereof;

step S155 of providing location-based services by executing a corresponding program of the application program storing part 118 by the mobile processor 102 using the GPS coordinates of the mobile device 100 calculated in step S150 and the service information, location information, and event codes of the received data buffer 108;

step S160 of inquiring whether provision of location-based services is continuously performed, and of returning to step S110 and repeating the subsequent steps upon determining that provision of location-based services is continuously performed; and step S165 of terminating a service upon determining in step S160 that provision of location-based services is not performed continuously.

Upon determining in step S110 that data has not been received, the mobile processor 102 further performs:

step S115 of reading, from the time/base station ID buffer 116, the IDs and the connection change (handover) time of the mobile communication base stations of macro-cells connected during a predetermined time interval and determining whether the mobile device 100 is moving, and of returning to step S110 and repeating the subsequent steps upon determining that the mobile device 100 is not moving;

step S120 of, upon determining in step S120 that the mobile device 100 is moving, determining through the GPS controlling part 110 by the mobile processor 102 whether the GPS receiving part 114 of the mobile device 100 is enabled, and of returning to step S110 and repeating subsequent steps upon determining that the GPS receiving part 114 is enabled; and step S125 of, upon determining in step S120 that the GPS receiving part 114 is disabled, enabling the GPS receiving part 114 through the GPS controlling part 110 by the mobile processor 102, and of returning to step S110 and repeating subsequent steps.

As described above, according to the GPS control system of a mobile device for location-based services and the method of operating the GPS control system according to the present invention, there is no need to select a separate application program for each service. Even when a GPS receiving part provided in the mobile device 100 is disabled for the application programs, the GPS receiving part may be enabled, mobile location-based services may be provided, and then the GPS receiving part may be restored to the original state thereof. In addition, according to the present invention, when the mobile device 100 moves at a speed higher than a predetermined speed, the movement may be detected, the GPS receiving part may be enabled, and mobile location-based services may be provided.

Although a GPS control system of a mobile device for location-based services and a method of operating the GPS control system according to the present invention have been described through limited examples and figures, the present invention is not intended to be limited to the examples. Those skilled in the art will appreciate that various modifications, additions, and substitutions are possible, without departing from the scope and spirit of the invention.

The invention claimed is:

1. A GPS control system of a mobile device for location-based services, wherein the location-based services are provided through a base station or a disaster detection transmission means and a near field communication means and the GPS control system is provided with a mobile device comprising:

a mobile processor for controlling the mobile device;

an air interface for communicating through a mobile communication network via the base station and a wireless channel such as near field communication (NFC), Bluetooth, and Wi-Fi;

a timer for setting and reading time intervals;

a received data buffer for storing service information, location information, and event codes received by the air interface;

a GPS controlling part for reading on/off states of a GPS receiving part and enabling or disabling the GPS receiving part under control of the mobile processor;

a GPS receiving part for calculating GPS coordinates of a current location of the mobile device;

an event code memory for determining effectiveness of event codes stored in the received data buffer by storing event codes for location-based services as tables;

a time/base station ID buffer for storing IDs and connection change (handover) time of mobile communication base stations of macro-cells connected during a time interval set by the timer; and an application program storing part for providing location-based services depending upon service information, location information, and event codes received by the air interface.

2. The GPS control system according to claim 1, wherein the mobile device is configured so that:

when various types of service information comprising disaster information, accident information, and lifestyle information, location information corresponding to each service information, and event codes are transmitted through the base station via a mobile communication network from a service server, the service information, the location information, and the event codes transmitted from the base station are received by the air interface of the mobile device and stored in the received data buffer, and the mobile processor reads the event codes from the received data buffer and refers to tables of the event code memory to determine whether the received event codes are effective event codes;

when the mobile processor determines that the effective event codes present in the tables of the event code memory have been received, the mobile processor determines, through the GPS controlling part, whether GPS receiving part is enabled, when the GPS receiving part is disabled, the mobile processor enables the GPS receiving part and calculates GPS coordinates of the mobile device, and then the mobile processor restores the GPS receiving part to a previous state thereof through the GPS controlling part; and when the information of the received data buffer is determined to be information within an effective area when comparing the location information transmitted from the base station and the GPS coordinates of the mobile device, a corresponding program of the application program storing part is executed to provide location-based services.

3. The GPS control system according to claim 1, wherein the mobile device is configured so that:

when service information, location information, and event codes transmitted from the disaster detection transmission means and the near field communication means are received by the air interface of the mobile device and are stored in the received data buffer, the mobile processor reads the event codes from the received data buffer and refers to tables of the event code memory to determine whether the received event codes are effective event codes;

when the mobile processor determines that the effective event codes present in the tables of the event code memory have been received, the mobile processor determines, through the GPS controlling part, whether the GPS receiving part is enabled, when the GPS receiving part is disabled, the mobile processor enables the GPS receiving part and calculates GPS coordinates of the mobile device, and then the mobile processor restores the GPS receiving part to a previous state thereof through the GPS controlling part; and when the information of the received data buffer is determined to be information within an effective area when comparing the location information transmitted from the disaster detection transmission means and the near field communication means and the GPS coordinates of the mobile device, a corresponding program of the application program storing part is executed to provide location-based services.

4. The GPS control system according to claim 1, wherein the mobile device is configured so that:

a predetermined time interval of T1 to T2 is set in the timer under control of the mobile processor, IDs and connection change (handover) time of mobile communication base stations of macro-cells connected during the set time interval are stored in the time/base station ID buffer, and then the mobile processor refers to the IDs and the connection change (handover) time of mobile communication base stations stored in the time/base station ID buffer to determine whether the mobile device is moving;

when the mobile processor determines that the mobile device is moving, the mobile processor determines, through the GPS controlling part, whether the GPS receiving part is currently enabled; and when the GPS receiving part is disabled, the mobile processor enables the GPS receiving part so that the mobile device is set to be in a state capable of receiving location-based services through the base station, the disaster detection transmission means, and the near field communication means.

5. A method of operating a GPS control system of a mobile device for location-based services, wherein the location-based services are provided through a base station or a disaster detection transmission means and a near field communication means and the method comprises:

initiating operation of a mobile device;

setting a predetermined time interval in a timer by a mobile processor of the mobile device and storing IDs and connection change (handover) time of mobile communication base stations of macro-cells connected during the set predetermined time interval in a time/base station ID buffer;

determining, through an air interface, by the mobile processor whether data has been received via a mobile communication network or a wireless channel;

reading event codes from a received data buffer by the mobile processor upon determining that data has been received;

determining, by the mobile processor, whether the event codes read in step S130 are effective by referring to tables of an event code memory, and returning to the step of determining whether data has been received when the event codes are not effective;

upon determining that the event codes are effective, determining, through a GPS controlling part, by the mobile processor whether a GPS receiving part of the mobile device is enabled;

enabling the GPS receiving part, through the GPS controlling part, by the mobile processor upon determining that the GPS receiving part is disabled;

calculating a location of the mobile device as GPS coordinates from the GPS receiving part by the mobile processor and enabling or disabling the GPS receiving part to restore the GPS receiving part to a previous state thereof;

providing location-based services by executing a corresponding program of an application program storing part by the mobile processor using the calculated GPS coordinates of the mobile device and service information, location information, and event codes of the received data buffer;

inquiring whether provision of location-based services is continuously performed, and returning to the step of determining whether data has been received upon determining that provision of location-based services is continuously performed; and terminating a service upon determining that provision of location-based services is not performed continuously.

6. The method according to claim 5, wherein, upon determining in step S110 that data has not been received, the mobile processor further performs:

reading, from the time/base station ID buffer, IDs and connection change (handover) time of mobile communication base stations of macro-cells connected during a predetermined time interval and determining whether the mobile device is moving, and of returning to the step of determining whether data has been received upon determining that the mobile device is not moving;

upon determining that the mobile device is moving, determining through the GPS controlling part by the mobile processor whether the GPS receiving part of the mobile device is enabled, and of returning to the step of determining whether data has been received upon determining that the GPS receiving part is enabled; and upon determining that the GPS receiving part is disabled, enabling the GPS receiving part through the GPS controlling part by the mobile processor, and of returning to the step of determining whether data has been received.

* * * * *